Aug. 23, 1960  A. F. FREDERICK ET AL  2,949,796
INDEXING MECHANISM
Filed Nov. 13, 1957  5 Sheets-Sheet 1

INVENTORS.
ALBERT F. FREDERICK
RALPH J. RABEL
BY
L. W. Wright & H. T. Keiser
ATTORNEYS.

Fig. 7.

INVENTORS.
ALBERT F. FREDERICK
RALPH J. RABEL
BY
L. W. Wright v H. T. Keiser
ATTORNEYS.

United States Patent Office 2,949,796
Patented Aug. 23, 1960

2,949,796

INDEXING MECHANISM

Albert F. Frederick, Mason, and Ralph J. Rabel, Cincinnati, Ohio, assignors to The Cincinnati Milling Machine Co., Cincinnati, Ohio, a corporation of Ohio Filed Nov. 13, 1957, Ser. No. 696,141

10 Claims. (Cl. 74—823)

The present invention relates to an improved backlash eliminator for a machine tool particularly suitable in conjunction with a rotating indexing fixture.

In order to move a workpiece mounted on a machine tool from one position, where one cutting operation is performed, to a second and subsequent positions, where additional cutting operations are performed, an indexing mechanism is provided. This mechanism must be capable of moving the work a precise predetemined distance to assure precision machining. A major problem to be overcome in achieving precises movement of the workpiece is the backlash inherent in any geared mechanism.

In the present invention a mechanism for indexing without backlash is provided. In brief, in the preferred embodiment described herein, the workpiece is mounted in a rotating fixture carrying a worm wheel which is driven by a worm carried on a drive shaft. A cam in geared engagement with the drive shaft has a locking face which engages a retractile locking pin. A motor engaged with the drive shaft urges the locking face against the pin before it is retracted, and, after it is retracted, rotates the drive shaft, and hence the cam. After the cam has completed one revolution, the pin is moved to engage the locking face on the cam, which is again urged against the pin by the motor. Thus, since the motor urges the cam against the pin at the beginning of each indexing cycle, and again at the end, the shaft will have been rotated through a precise predetermined angle. At the same time the motor holds the drive shaft and drive worm rigidly locked when the locking members are engaged.

In order to transmit this predetermined shaft rotation to the workpiece without any loss of precision because of backlash between the drive shaft and the worm wheel mounted on the indexing fixture which carries the workpiece, an additional shaft having a worm gear which engages with the worm wheel of the fixture is provided. This second shaft consists of two portions in telescoping, non-rotating relationship. One portion of this shaft is engaged with the drive shaft for rotation therewith. The other portion of the shaft, which carries the worm, is received in a hyrdaulic cylinder for axial, or longitudinal, movement in a direction tangential to the worm wheel, when the drive shaft is not rotating.

Because the worm on the second shaft is engaged with the worm wheel, movement of the portion of this shaft carrying the worm will rotate the worm wheel. When this movement is in a direction to rotate the worm wheel in the normal operating direction the faces opposite the driven faces of the teeth on the worm wheel are urged against the faces opposite the drive face on the drive worm. When each indexing rotation is begun and ended with the teeth of the worm and worm wheel thus engaged, the indexing rotation will correspond precisely to the exact rotation of the drive shaft.

This indexing mechanism is exceptionally accurate because the rotation of the indexing fixture is begun and ended at a point defined by the contact of the faces of the drive and worm gear which are not subject to wear. Thus, even after long use, and even if the drive and driven faces of the respective gears are worn, and even if they are worn unevenly, the accuracy of the indexing mechanism will be unaffected. Moreover, wear on the teeth of the gears is minimized since the backlash eliminating rotation of the workpiece is achieved, not by rotation of a gear against the teeth of the worm gear, but by bodily movement of a gear in relation to the worm gear.

It is, therefore, an object of the present invention to provide an improved mechanism to eliminate backlash between a driving element and a driven element in a machine tool.

It is another object of the present invention to provide an improved indexing mechanism wherein the indexing movement occurs between two positions where the faces opposite the driving face and the driven face of the driving gear and driven gear, respectively, are in firm contact.

It is yet another object of the present invention to provide a mechanism in which the backlash is taken up by a member acting tangentially to the driven gear and without wearing rotation on the driven gear.

It is still another object of the present invention to provide an indexing mechanism wherein indexing movement occurs between two positions where the drive gear is held positively locked against a stopping mechanism by driving power transmitted to the drive gear.

It is a further object of the present invention to provide a simple, positive acting, effective mechanism to move a workpiece a precise predetermined distance between cutting operations in a machine tool.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In the drawings, in which like reference numerals indicate like or similar parts.

Figure 1:
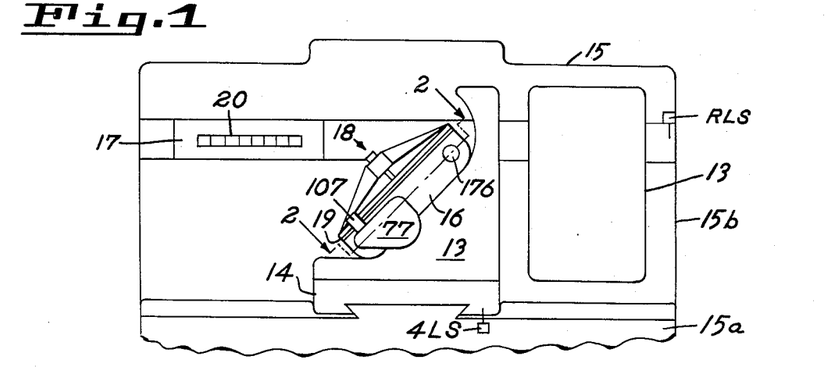
Fig. 1 is a front elevational view of a broaching machine having a rotatable indexing fixture with the mechanism of the present invention.

As shown in Fig. 1, the frame 15 of a horizontal broaching machine has a base portion 15a adapted to carry a table 14 and an upstanding portion 15b adapted to carry a ram 17. The ram 17, which carries a cutter 20, reciprocates horizontally, cutting the work 19, which is carried by the indexing fixture 18, as the ram moves from left to right when viewed as shown in Fig. 1. The table 14 reciprocates between a cutting position, adjacent the upstanding portion 15b of the base, and a retracted position where the work is spaced from the cutting tool 20 carried by the ram. The fixture 18 rotates in a fixture bed 16, carried by supporting structure 13 mounted on the table, to define an indexing fixture which rotates the work through an exact predetermined angle into the proper position for the cutting operation. In one revolution of the indexing fixture 18 the workpiece 19 may have a plurality of cuts made about its periphery. After each cutting stroke the table 14 retracts and the index fixture 18, and the workpiece 19, rotate to a position for the next cut, while the ram 17 is returning to the left hand position, as viewed in Fig. 1. The table then returns to the cutting position for the next stroke of the ram. A control panel 13 is mounted on the front of the machine.

Figures 2, 5:
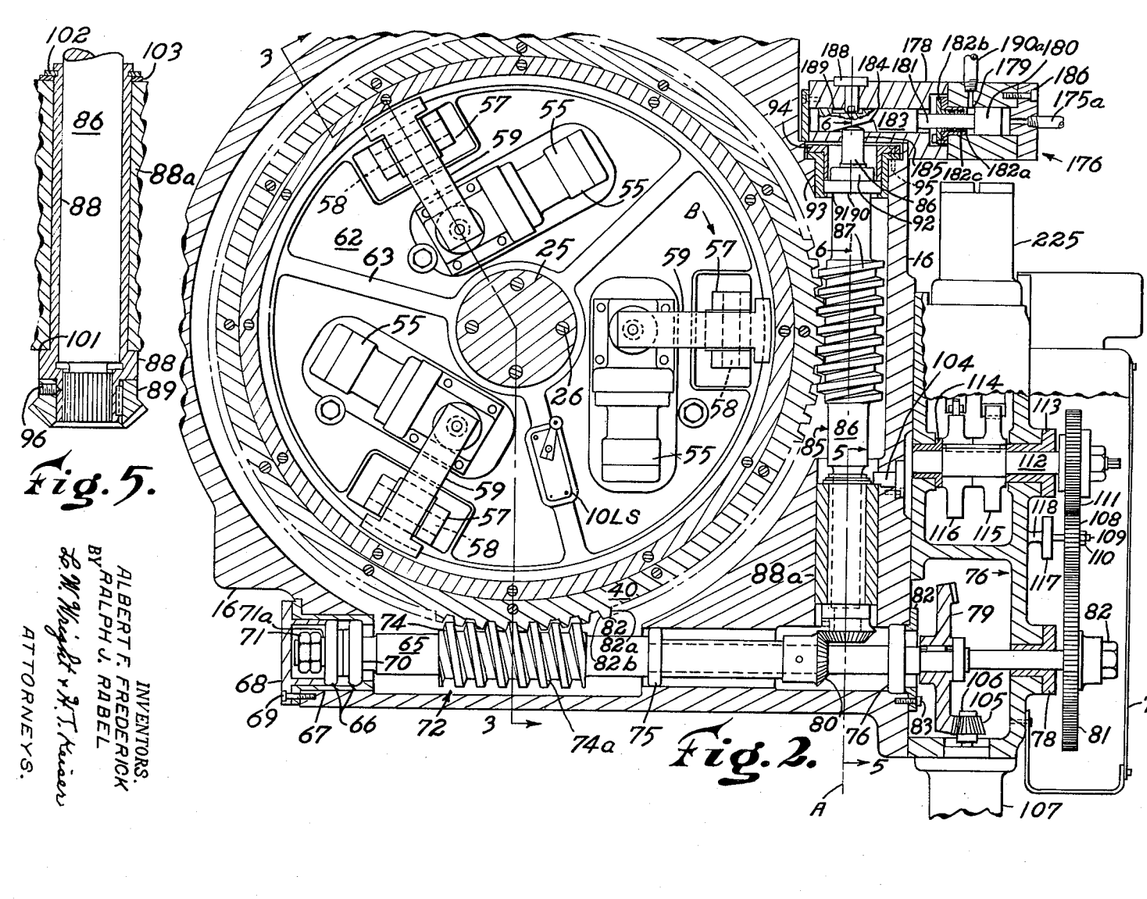
Fig. 2 is a view through section 2—2 of Fig. 1.
Fig. 5 is an enlarged view through section 5—5 of Fig. 2.
Figures 3, 4:
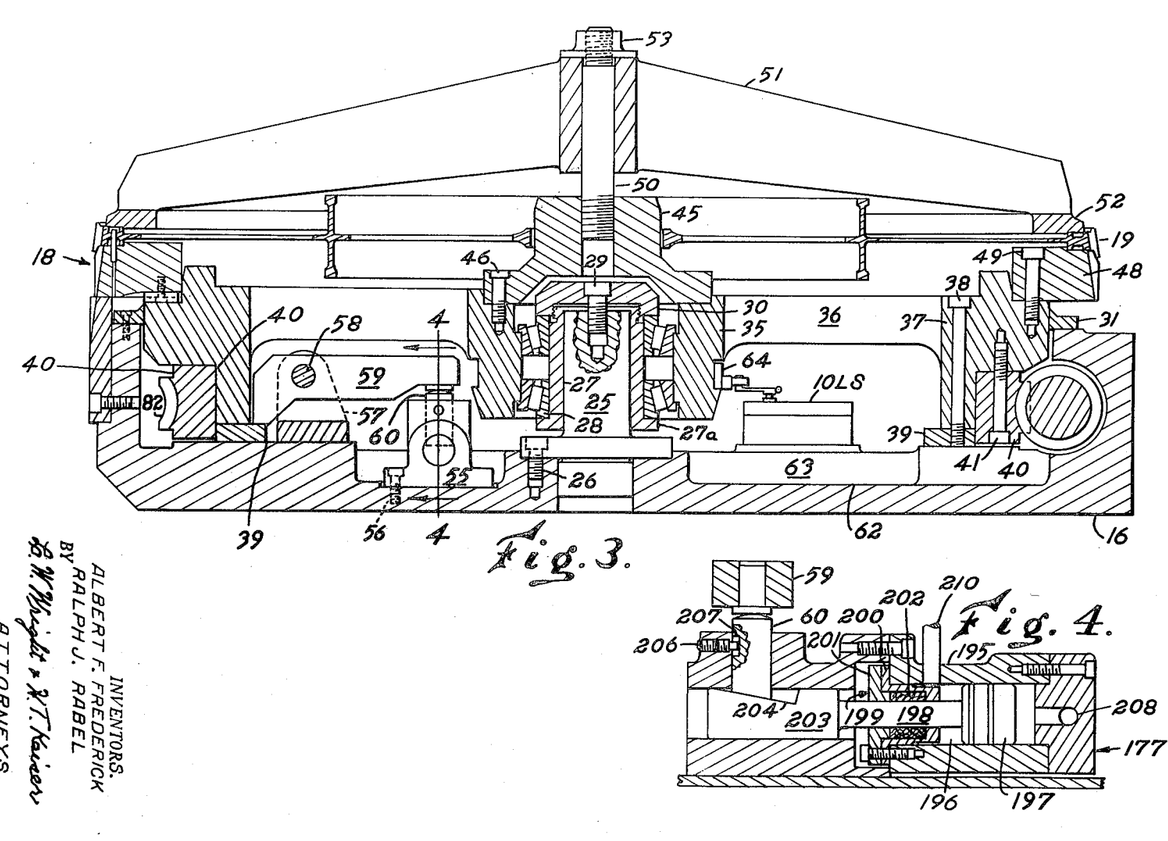
Fig. 3 is a view through section 3—3 of Fig. 2.
Fig. 4 is an enlarged view through section 4—4 of Fig. 3.

The construction of the rotatable fixture 18 and its mounting in the fixture bed 16 is shown in Figs. 2 and 3. As shown in Fig. 3, the fixture bed 16 has a centrally disposed upstanding cylindrical post 25, secured to the bed 16 by bolts 26, which snugly receives sleeve 27 having a flange 27a at its lower end and a threaded portion at its upper end. The antifriction bearing 28 is received on the sleeve 27 and is held snugly in position against the flange 27a by the cap 30 which is bolted to the post 25 by bolt 29 and is threadedly engaged with the upper portion of the sleeve 27. The indexing fixture 18 has a hub portion 35 which is received on and carried by the bearing 28 for rotation in relation to the bed 16. The hub 35 has radial arms 36 which carry, at their outer ends, a rim portion 37. The rim portion 37 has bolted thereto by bolts 38, at its lower edge, below the arms 36, a ring 39, the inner margin of which extends inboard of the inboard face of rim 37. A ring 31 encircling the rim portion 37 adjacent the upper portion of the bed 16 provides a dirt seal. A worm wheel gear 40, having external teeth 82, is bolted by bolts 41 into a recess in the lower portion of the rim 37 to encircle the rim as shown in Fig. 3 and defines a driven gear which imparts rotation to the fixture 18. In normal operation the worm wheel 40 rotates in the direction of the arrow B in Fig. 2, and the faces 82a of teeth 82 define the driven faces while 82b designates the opposite faces of the teeth.

A centrally disposed fitting 45 is bolted, by bolts 46, to the upper portion of the hub 35, as shown in Fig. 3. The fitting has a recess in its lower edge to clear the upstanding post 25 and cap 30 and has outer conformations to receive a workpiece, which is shown for illustrative purposes at 19. An annular fitting 48 is bolted by bolts 49 to the upper portion of rim 37 to receive the outer portion of the workpiece 19. The central fitting 45 threadedly receives an upstanding bolt 50 which receives a spider 51 having an annular clamping ring 52 which holds the work in position when the spider is tightened by nut 53 on the bolt 50.

The fixture bed 16 has an annular recess 62 around the upstanding post 25 as shown in Figs. 2 and 3. This recess is divided by a plurality of webs 63. A plurality of hydraulic cylinders 55 are circumferentially spaced around the post 25 in the recesses 62 and are bolted to the bed by bolts 56. An upstanding clevis 57 is secured to the bed 16 adjacent the recesses 62, outboard of each cylinder 55, and carries a pin 58 which pivotally receives clamping arm 59. The inboard portion of each arm 59 is adapted to engage a plunger 60 of hydraulic cylinder 55 (see Figure 4) while the outboard portion of each arm 59 is adapted to engage the margin of the fixture ring 39 extending inboard of the rim portion 37 of the fixture. A limit switch 10LS is carried on one of the webs 63 and has an arm adapted to be engaged by a cam surface 64 on the rotating hub 35 of the indexing fixture.

A drive shaft 65 is carried in the fixture bed 16 as shown in Fig. 2. At one end the drive shaft 65 is received in bearings 66 secured in position by the sleeve 67 and the cap 68 which are bolted to the bed 16 by bolts 69. The shaft 65 is held against longitudinal movement by a shoulder 70, abutting against the bearing 66, a spacer 71a, and lock-nuts 71 secured to the end of the shaft. Worm 72 with a driving face 74 and an opposite face 74a is secured to the drive shaft and engages the teeth 82 of worm gear 40 to define a drive gear which imparts rotation to the driven gear 40. The shaft 65 extends through the bed 16, where it is supported by bearings 75 and 76, the latter being held in the bed by the ring 82 secured to the bed by bolts 83', and through the housing 76 into the space enclosed by casing 77. The shaft is journaled in bushing 78 in the face of housing 76 and carries within the housing a bevel ring 79. The shaft 65 also carries a bevel gear 80 inside the bed and a spur gear 81, which is held on the shaft by nut 82, inside the casing 77.

Figure 6:
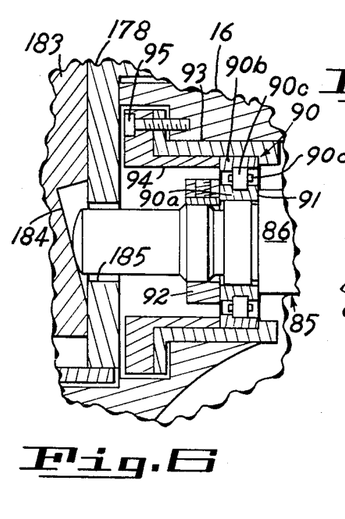
Fig. 6 is an enlarged view through section 6—6 of Fig. 2.

A second shaft 85 having a longitudinal axis A is carried in the bed 16 and comprises a worm-carrying portion 86, which carries worm 87 in engagement with the teeth 82 of worm gear 40 at a position circumferentially spaced ninety degrees from the worm 72 carried by the drive shaft, and a second portion 88 (see Figure 5) carrying at its end bevel gear 89 which engages bevel gear 80 on the drive shaft 65. The two portions of shaft 85 are movable longitudinally in relation to each other so that while the second portion 88 is in a relatively fixed position with bevel gear 89 in engagement with gear 80 on the drive shaft the worm carrying portion 86, and hence the worm 87, is free to move longitudinally. The free longitudinal movement between the two ends of the shaft 85 is accomplished by the construction shown best in Figs. 5 and 6. As shown in Fig. 6, the inner race 90a of the bearing 90 is securely held against the shoulder 91 of the worm carrying portion 86 of the shaft 85 by the collar 92. The outer race 90b of the bearing 90, which is movable longitudinally in relation to the inner race 90a, is securely held between the sleeve 93 and the cap 94 which are bolted to the bed 16 by bolts 95. Sandwiched between the inner race 90a and the outer race 90b of the bearing 90 are the longitudinally aligned bearing pins 90c held in circumferentially spaced relation by cage 90d. These roller pins are received in a shallow recess in the inner race 90a and hence remain fixed longitudinally in relation to the inner race. However, the pins 90c are free to slide longitudinally in relationship to the outer race 90b, and hence relative longitudinal movement between the worm carrying portion of the shaft 86 and the bed 16 is permitted.

The second portion 88 of the shaft 89 is defined by a sleeve which slidably receives the worm carrying portion 86 as shown best in Fig. 5. The end of the portion 86 is splined to the inside of sleeve 88 so that while relative longitudinal motion can take place between the two portions of the shaft no relative rotation will occur. Keyed to the outside of the sleeve 88 is the bevel gear 89 which is locked in position by set screw 96. Sleeve 88 is held in fixed position in a bushing 88a by shoulder 101 and locking ring 102. Washer 103 is sandwiched between the ring 102 and bushing 88a. Retaining pin 104 (see Fig. 2) bolted to the fixture bed 16 holds the bushing 88a in position in fixture bed 16.

Figure 7:
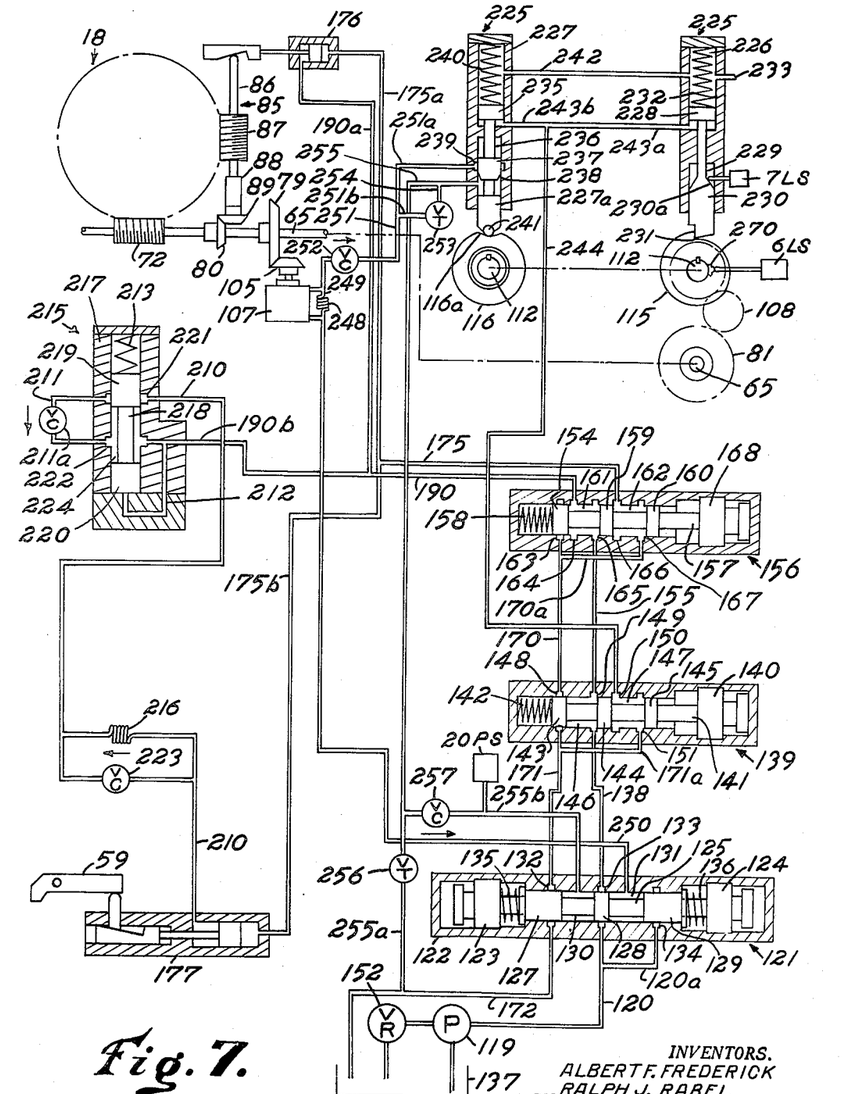
Fig. 7 is a schematic diagram of the hydraulic system for the indexing mechanism of the machine of Fig. 1.

Ring bevel gear 79 on drive shaft 65 engages, inside the housing 76 which is connected to fixture bed 16, with bevel gear 105 carried on the shaft 106 extending into the housing from the hydraulic motor 107 connected to the outside of the housing 76. Inside the casing 77, which is connected to the housing 76, the spur gear 81, held on the drive shaft 65 by the nut 82, engages the idler gear 108. The idler gear 108 is mounted on shaft 109 with nut 110, the shaft 109 being secured in a longitudinal slot (not shown) in the plate 117 which is adjustably rotatable about the shaft 118 protruding from the housing. The idler 108 is engaged with gear 111 carried on the shaft 112 which is journaled in bushings 113 and 114 received in each side of housing 76. The shaft 112 carries locking cam 115 and control cam 116 within the housing 76. These two cams cooperate with the mechanism in the dual hydraulic cylinder 225. The cam 115 has a locking shoulder 231 adapted to engage with a retractile pin 230, as shown in Fig. 7. The pin serves to lock the cam 115 after one revolution, and hence lock the drive shaft 65 and worm 72 after rotation through a predetermined angle. The predetermined rotation of the drive shaft and worm imparts rotation to the indexing fixture 18 and the workpiece 19, the amount of that rotation depending on the ratio of the gears 81, 108, and 111.

The above-described mechanism is actuated by an electrically controlled hydraulic system shown in Fig. 7. Fluid under pressure is supplied from the reservoir 137 by pump 119. A relief valve 152 is connected between the pump and the reservoir. The pressure line 120 connects the pump to the solenoid actuated valve 121 containing, within the casing 122, on the left hand side as shown in Fig. 7, solenoid 123 and on the right hand side solenoid 124 which, when energized, move the slidable valve member 125 to the right and to the left, respectively. The valve has spaced spools 127, 128, and 129 on the valve member defining annular passages 130 and 131 between the valve member 125 and the casing 122. The casing also has circular internal grooves 132, 133, and 134 through which fluid is free to flow even when a spool is aligned therewith. The branch conduit 120a connects the conduit 120 to the groove 134. When neither the solenoid 123 nor the solenoid 124 is energized, the valve member 125 under the action of springs 135 and 136 assumes the position shown in Fig. 7 with the spool 128 aligned with the groove 133.

Conduit 120 is connected to the groove 133 of valve 121 to which is also connected the conduit 138, leading to the solenoid valve 139. The valve 139 has a solenoid 140 which, when energized, moves the valve member 141 from the position shown in Fig. 7 to the left against the action of spring 142. The valve member 141 has spools 143, 144, and 145 carried thereon defining annular passages 146 and 147. The casing of valve 139 has circular internal grooves 148, 149, 150, and 151 around which fluid can flow regardless of the location of the spools. Pressure line 138 is connected to groove 149 of valve 139 to which is also connected the conduit 155 leading to valve 156. The valve 156 has a valve member 157 which is actuated when solenoid 168 is energized to shift from the position shown in Fig. 7 to the left against the action of spring 158. The valve member 157 carries spools 154, 159, and 160, which are spaced to define annular passages 161 and 162. The casing of valve 156 has circular internal grooves 163, 164, 165, 166, and 167.

Defining a discharge line from the valves 121, 139, and 156 are conduits 170 connecting grooves 163 and 148 of valves 156 and 139, respectively, with a branch conduit 170a connected to groove 167; conduit 171 connecting grooves 148 and 132 of valves 139 and 121, respectively, with a branch conduit 171a to groove 151 of valve 139; and conduit 172 leading from groove 132 of valve 121 to the reservoir 137.

Groove 166 of the valve 156 is connected to the hydraulic cylinder 176 through conduits 175 and 175a, and to the hydraulic cylinder 177 through conduits 175 and 175b. The hydraulic cylinder 176 is mounted on the fixture bed 16 at the end of shaft 85 as shown in Fig. 2. The cylinder 176 has a wall 178 defining a chamber 179 in which the piston 180 is slidably carried. The piston has a rod 181 extending through the seal 182 comprising a sleeve 182a, a cap 182b, and packing 182c and which is bolted in a groove in the cylinder wall. The rod has an enlarged portion 183 at the end opposite the piston with an inclined cut 184 therein to define a wedge. The wall 178 has an opening 185 adjacent the cut 184 through which the end of the worm carrying portion 86 of the shaft 85 extends for engagement with the wedge-defining cut 184. The stop pin 188 received in the cylinder wall cooperates with slot 189 in the enlarged portion 183 of the rod to limit axial movement of the rod. The end 186 of the cylinder receives conduit 175a to communicate with chamber 179 on the side of the piston opposite the rod 181, while the wall of the cylinder on the opposite end of the piston receives conduit 190a to communicate with chamber 179 on the side of the piston to which rod 181 is connected.

The hydraulic cylinder 177 is shown best in Fig. 4. The cylinder 177 has a wall 195 defining a chamber 196 in which the slidable piston 197 is received. The piston has a rod 198 passing through the seal 199 comprising the sleeve 200, the cap 201, and the packing 202. The seal is secured in a recess in the wall of the cylinder. The rod has an enlarged portion 203 which has a cut 204 defining a wedge. Plunger 60 is slidably received in the wall of the cylinder adjacent the wedge cut and is retained in the wall by set screw 206, which engages the slot 207 in the plunger. The plunger is positioned to engage one end of the clamping arm 59. The chamber 196 is connected on the side of the piston opposite the rod 198 to the conduit 175b through passage 208 and is in communication on the other side of the piston with conduit 210.

As shown in Fig. 7, the groove 164 of the valve 156 is connected to the cylinder 176 through conduits 190 and 190a. The groove 164 is also connected to cylinder 177 through conduit 190, 190b, sequence valve 215, and conduit 210. The speed control restriction 216 in the line defined by conduit 210, restricts the flow of fluid from valve 215 to cylinder 177, while the check valve 223 connected across the restriction 216 permits unrestricted flow from the cylinder 177 to the valve 215. The sequence valve 215 has a wall 217 defining a chamber 224 and two spaced circular internal grooves 221 and 222.

The chamber slidably receives a valve member 218 carrying two spaced spools 219 and 220. The conduit 190b is connected to the groove 222, through which fluid will flow regardless of the position of the spools and communicates with the chamber 224 between the spools 219 and 220. Conduit 190b is also connected by the passage 212 drilled in the wall 217 to the chamber 224 on the other side of the spool 220. The conduit 210 is connected to the groove 221, and the groove 221 is connected to the groove 222 by the conduit 211 containing check valve 211a. The valve member 218 is urged to a position blocking conduit 210 with spool 219 by the spring 213. With this construction, fluid flowing to the cylinder 215 through conduit 190b is diverted through passage 212 into the chamber to move the valve member 218 against the action of the spring 213 and connect, after a period of time, the conduit 190b with the conduit 210. On the other hand, fluid flowing from the cylinder 177 through line 210 into line 190b will pass directly through the valve without delay through the groove 221, conduit 211, and groove 222. In this manner, the operation of the clamping cylinder 177 is delayed until after the operation of the cylinder 176, thus assuring that the worm gear 40 is rotated to bear against the drive worm before the fixture is clamped to the fixture bed.

The dual hydraulic cylinder 225, shown in Fig. 2, comprises chambers 226 and 227 as shown in Fig. 7. The chamber 226 slidably receives piston 228 which has the rod 229 carrying locking pin 230 normally urged by spring 232 to engage the locking shoulder 231 on cam 115. The locking pin 230 engages switch 7LS to operate that switch has the locking pin is disengaged, or retracted, from the cam 115. Air is vented from the upper portion of chamber 226 by conduit 233. The chamber 227 slidably receives piston 235 which has the rod 236 carrying the spool 237 having at its lower end the tapered portion 238. A groove 239 is cut in the wall of the cylinder adjacent the spool 237 when the spool is urged into the position shown in Fig. 7 by the spring 240. In this position, the follower 241 on the end of rod 236 is urged into engagement with the control cam 116. Air is vented from the upper portion of chamber 227 to conduit 242, chamber 226, and conduit 233. Conduits 243a and 243b connect with chambers 226 and 227 respectively below the pistons carried in those chambers. These conduits are connected to the conduit 244 which connects to the groove 150 of valve 139.

Conduit 250 is connected to annular passage 131 of valve 121 and leads to the hydraulic motor 107. Conduit 251, which contains check valve 252, connects the motor to branch conduit 251a which connects to groove 239 in the wall of chamber 227. The motor 107 is also connected through conduits 251 and 251b to the throttle valve 253. The throttle valve is connected by conduit 254 to conduit 255 which connects the control cylinder chamber 227 below the spool 237 to conduit 255a. This latter conduit contains the throttle valve 256. The branch conduit 255b is connected to the conduit 255a on the control cylinder side of the throttle valve 256 and leads to the annular passage 130 in valve 121. Conduit 255b contains the check valve 257 and the pressure switch 20PS. The branch conduit 255a is connected to the conduit 172 and thereby defines a discharge passage to the reservoir 137. Conduit 250 is connected to conduit 251 by conduit 249 containing the restriction 248 to permit turning the motor 107 manually when the system is not operating.

Figure 8:
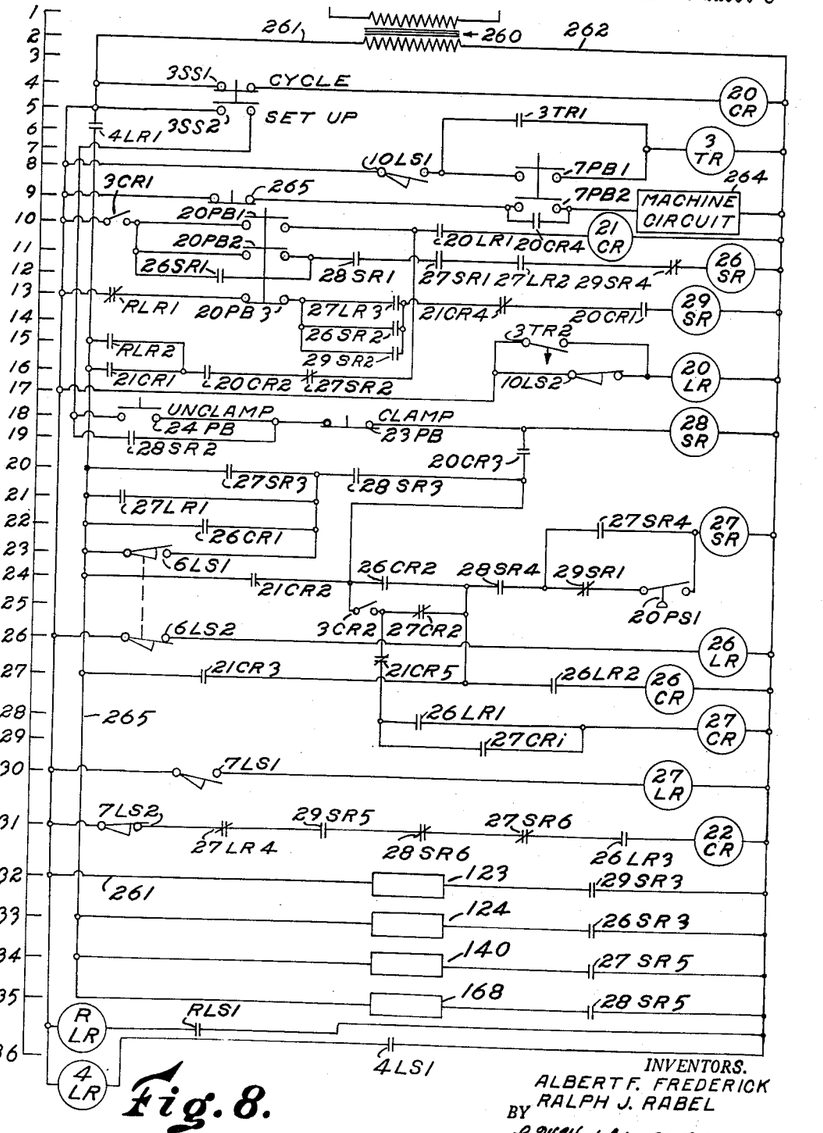
Fig. 8 is a wiring diagram of the indexing mechanism of the mchine of Fig. 1.

The electrical circuit for the indexing fixture is shown in Fig. 8. In the description the numbers in parentheses correspond to the numbers on the left side of the drawing to show the location of the part on the drawing. The primary of transformer 260 (1) is connected to a source while the secondary is connected to conductors 261 and 262. Relay RLR (36) having normally closed contact RLR$_1$ (13) and normally open contact RLR$_2$ (15) is connected in series with the normally open contact RLS$_1$ of switch RLS across conductors 261 and 262. Switch RLS is mounted, as shown in Fig. 7, for operation when the ram 17 reaches the right hand position of Fig. 1 at the completion of a cutting stroke. Relay 4LR (36) having normally open contact 4LR1 (6) is connected across conductors 261 and 262 in series with the normally open switch contacts 4LS1 of switch 4LS. This latter switch is mounted, as shown in Fig. 1, to operate as the table reaches its retracted position with the work spaced from the cutting tool. The control relay 20CR (4) having normally open contacts 20CR1 (13), 20CR2 (16), 20CR3 (19), and 20CR4 (9) is connected across conductors 261 and 262 through contact 3SS1 of the push button switch 3SS. The push button switch 7PB (8) serves to connect momentarily relay 3TR (6), having normally open contacts 3TR1 (5), and 3TR2 (14), across conductors 261 and 262 when normally open contact 10LS1 (8) of switch 10LS located on the web 63 of fixture bed 16 (Figs. 2 and 3) is closed. The switch 10LS is actuated by the cam surface 64 to operate at all times except when the fixture is in an initial, or zero, position at which time the switch is released. Contact 3TR1 (5) is connected across contact 7PB1 (8) to seal in relay 3TR when 7PB is operated.

The machine circuit 264 (9) comprising circuitry to control the cutting cycle of the machine, is connected across the conductors 261 and 262 through normally closed "cycle stop" push button switch 265 (9) and contacts 7PB2 (9), the contacts 20CR4 (9) being connected across the latter contacts to seal in machine circuit 264 after release of push button 7PB.

The relay 20LR (16), having normally open contacts 20LR1 (10) is connected across conductors 261 and 262 by alternate circuits containing respectively, normally closed contact 10LS2 (16), which is closed at the beginning and end of the fixture revolution, and contact 3TR2 (14) having a delay opening mechanism which is closed during the revolution of the fixture but open at the beginning and end of that revolution, thus holding relay 20LR energized during the entire revolution of the indexing fixture.

Conductor 265' is connected to conductor 261 through normally open contacts 4LR1 (6) of relay 4LR (36).

Relay 21CR (10) having normally open contacts 21CR1 (16), 21CR2 (24), and 21CR3 (27), and normally closed contacts 21CR4 (13) and 21CR5 (27) is connected across conductors 265 and 262 through a circuit containing contacts RLR2 (15), 20CR2 (16), 27SR2 (16), and 20LR1 (10). Contact 21CR1 (16) is connected across the contact RLR2 (15) to seal in relay 21CR after the ram 17 leaves the right hand position of Fig. 1, thereby releasing RLS1 and deenergizing relay RLR.

Relay 28SR (18), having normally open contacts 28SR1 (11), 28SR2 (19), 28SR3 (20), 28SR4 (23), 28SR5 (35), and normally closed contact 28SR6 (31), is connected across conductors 265 and 262 through contacts 21CR2 (24) and 20CR3 (19). Solenoid 168 (35) of valve 156 is connected across conductors 265 and 262 in series with contacts 28SR5 (35).

Relay 27SR, having normally open contacts 27SR1 (12), 27SR3 (20), 27SR4 (22), 27SR5 (34), and normally closed contacts 27SR2 (16) and 27SR6 (31) is connected across conductors 265 and 262 through contacts 21CR2 (24), 26CR2 (24), 28SR4 (24), 29SR1 (14), and normally closed contacts 20PS1 (24). Contacts 20SP1 open when switch 20PS (see Fig. 7) is operated in response to a relatively high pressure in conduit 255b between check valve 257 and valve 121. Contact 27SR4 (22) is connected across contacts 29SR1 and 20PS1 (24) to seal in relay 27SR when either of these are opened. Solenoid 140 of valve 139 is connected in series across lines 265 and 262 with contact 27SR5.

A network comprising the parallel connected contacts 27SR3 (20), 27LR1 (21), 26CR1 (22), and 6LS1 (23) and series connected contact 28SR3 (20) define an alternate path, together with contact 20CR3 (19) for the relay 28SR between the conductors 265 and 262, as well as an alternate path for relay 27SR (22) between these conductors in conjunction with contacts 26CR2 (24), 28SR4 (24) and either 27SR4 (21) or 29SR1 (24), and 20PS1 (24). This network also provides an alternate path for relays 26CR (27) and 27CR (28).

Relay 26LR (26), having normally open contacts 26LR1 (28), 26LR2 (27), and 26LR3 (31) is connected in series across conductors 261 and 262 with contacts 6LS2 (26) of switch 6LS. Switch 6LS which has normally closed contacts 6LS1 and normally open contacts 6LS2 is operated by a dog 270 on cam 115 when the locking shoulder 231 is in position for engagement with locking pin 230, as shown in Fig. 7.

Relay 26CR, having normally opened contacts 26CR1 (22) and 26CR2 (24) is connected across conductors 265 and 262 in series with contacts 26LR2 and 21CR3. An alternate circuit for this relay is provided by the network of parallel connected contacts 27SR3 (20), 27LR1 (21), 26CR1 (22), and 6LS1 (23), and series connected contacts 28SR3 (20), 26CR2 (24), and 26LR2 (27).

Relay 27LR (30), having normally opened contacts 27LR1 (21), 27LR2 (11), and 27LR3 (13), and normally closed closed contacts 27LR4 (31) is connected in series with normally open contacts 7LS1 (30) across conductors 261 and 262. Relay 29SR (13) having the normally closed contact 29SR1 (24), the normally open contacts 29SR2 (15), 29SR3 (32), the normally closed contact 29SR4 (11), and the normally open contact 29SR5 (31) is connected across conductors 261 and 262 in series with contacts 20PB3 (13), 27LR3 (13), 21CR4 (13), 20CR1 (13), and RLR1 (13). The parallel connected contacts 26SR2 (14), and 29SR2 (15) are connected across the contact 27LR3. The solenoid 123 (32) of valve 121 is connected in series with contact 29SR3 (32) across conductors 261 and 262.

The relay 22CR (31) is connected across conductors 261 and 262 through contacts 7LS2, 27LR4, 29SR5, 28SR6, and 26LR3. This relay, when energized, initiates forward movement of the table.

To obtain rapid movement of the fixture without indexing stops the contacts 3CR1 (10) and 3CR2 (25) are closed. The "rapid index" push button switch 20PB which has normally open contacts 20PB1 (10), normally open contact 20PB2 (11) and normally open closed contacts 20PB3 (13) is operated. The contact 3CR1 and 20PB1 are connected in series to provide, in conjunction with 20LR1, a circuit for relay 21CR across conductors 261 and 262. Relay 26SR (11) having normally open contacts 26SR1 (12), 26SR2 (14), and 26SR3 (33) is connected across conductors 261 and 262 through contact 3CR1, 20PB2, 28SR1, 27SR1, 27LR2, and 29SR4 (10). Contacts 26SR1 (12), connected across 20PB2 seals in relay 26SR.

Relay 27CR, having normally open contacts 27CR1 (29) and normally closed contacts 27CR2 (25) is connected between line 262 and the network comprising the parallel connected contacts 26LR1 (28) and 27CR1 (29) and series connected contacts 21CR5 (26). This network is connected by alternate paths through 3CR2 (25) or 27CR2 (25) and 26CR2 (24) to line 265 through either 21CR2 (24) or the network consisting of 28SR3 (20) and parallel connected contacts 27SR3 (20), 27LR1 (21), 26CR1 (22), and 6LS1 (23).

A "set-up" circuit is provided between conductors 261 and 262 including contacts 3SS2 (5), 24PB (18), 23PB (18) and relay 28SR. Contact 28SR2 is connected across contact 24PB. When contacts 3SS2 (5) are closed, only clamping and unclamping operations can occur. Clamping is accomplished by operation of 23PB while unclamping is accomplished by operation of 24PB (18).

Figure 9A:
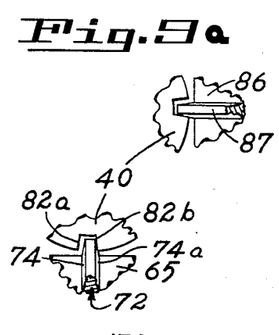
Figs. 9a to 9e are schematic drawings showing in sequence the relation of the driving worm and the teeth of the driven worm gear during the indexing cycle.
Figure 9B:
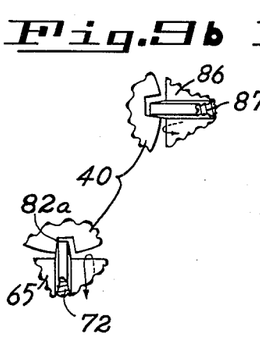

During the cutting stroke the table 14 is in the forward position, and the ram 17 carries tool 20 from left to right to cut the work held in the indexing fixture 18 as shown in Fig. 1. At this time switch 3SS (Fig. 8 (4)) is in the cycle position with contact 3SS1 closed. Relay 28SR, and hence solenoid 168 of valve 156 is deenergized, and the valve member 157 is in the position shown in Fig. 7 so that fluid under pressure is applied from the reservoir 137 through pump 119, conduit 120, groove 133 of the valve 121, conduit 138, groove 149 of valve 139, conduit 155, passage 161 of valve 156, and conduit 190 to both conduits 190a and 190b as shown in Fig. 7. The pressure in conduit 190a acts in cylinder 176 to urge the wedge 184 against the end of shaft 85. The pressure in line 190b operates through valve 215, valve 216, conduit 210 and cylinder 177 to hold the fixture 18 clamped in the fixture bed 16 with the arms 59. At the same time, relay 29SR, and hence solenoid 123 of valve 121, is energized, through the normally closed contacts RLR1 of switch RLS operated by the ram, and the valve member 125 is shifted to the right of the position shown in Fig. 7. Consequently, pressure is supplied through conduit 120, passage 130 of valve 121 to line 255b to hold contacts 20PS1 of switch 20PS open. Fluid under pressure is also supplied to hydraulic motor 107 through conduit 120a, passage 131 of valve 121, and conduit 250. Relay 27SR, hence solenoid 140, is deenergized at this time, and valve member 141 of valve 139 is in the position shown in Fig. 7. Thus, no pressure is supplied to the chambers 227 and 226 of hydraulic cylinder 225 and the cam follower 241 and stop pin 230 are in the positions as shown in Fig. 7, in contact with their respective cams 116 and 115. Thus, during the cutting stroke of the tool the fixture is clamped in the fixture bed and the drive shaft is locked against rotation. However, power is supplied to the motor to urge the locking cam against the locking pin and hence the driving worm is rigidly locked in position. As shown in Fig. 9a, the driving face 74 of the drive worm is spaced from the driven face 82a of the fixture gear.

When the ram reaches the hight hand end of its stroke (as viewed in Fig. 1) switch RLS is operated to energize relay RLR and open contact RLR1 to deenergize relay 29SR and solenoid 123 of valve 121. This moves the valve member 125 to the position shown in Fig. 7 and disconnects the conduit 250 leading to hydraulic motor 107 from the pressure source. At the same time, the conduit 255b is disconnected from the pressure source, and the pressure in that conduit falls, due to leakage, to release switch 20PS and close contacts 20PS1. Contact RLR2 closes as the ram reaches the right hand side and control relay 21CR is energized through a circuit including the normally open contact 20LR1. It will be noted that relay 20LR is energized at this time, either through switch contact 10LS2 if the index fixture is in any position, but the zero degree position and, if on the zero degree position, through the delay open contact 3TR2.

Energization of relay 21CR energizes relay 28SR, and hence solenoid 168 of valve 156, to operate that valve and shift valve member 157 to the left of the position shown in Fig. 7. This diverts pressure from line 190, and hence lines 190a and 190b, to conduit 175 and conduits 175a and 175b, reversing the action of cylinders 176 and 177 to unclamp the fixture and relieve the force on shaft 85.

With the normally open contact 6LS2 closed, as it is when the cam 115 (Fig. 7) is in the locked position as shown, the relay 26LR is energized, thereby energizing relay 26CR, so relay 27SR is energized and consequently solenoid 140 of valve 139 is also energized. This shifts valve member 141 to the left of the position shown in Fig. 7 to supply pressure to the conduit 244, and hence conduits 243b and 243a. The piston 235 is raised to connect lines 251a and 255 and raise the follower 241 off cam 116. The piston 228 is also raised to elevate the stop pin 230 and unlock cam 115 as well as operate switch 7LS.

Figure 9C:
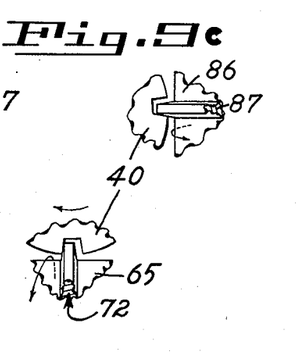

Upon operation of switch 7LS contact 7LS1 closes, energizing relay 27LR. Since relay 21CR became deenergized on the energization of relay 27SR, which opened contact 27SR2, and since the normally closed contact RLR1 closes as the ram leaves the right hand position on its return stroke, 29SR becomes energized again. This reenergizes solenoid 123 of valve 121, shifting the valve member 125 to the right of the position shown in Fig. 7. Pressure is then supplied from conduit 120a, through passage 131, to conduit 250 and motor 107. The motor runs at the normal feed rate, discharging through conduits 251, 251a, cylinder chamber 227 (spool 237 having previously been elevated), conduit 255, throttle valve 256, conduit 255a, and conduit 172 to the reservoir 137. With the valve member 125 in the right hand position, pressure is reestablished on line 255b and no discharge can take place through check valve 257. Since the cam 115 is unlocked, the motor rotates the drive shaft 65 and the worm 72. The initial rotation of the drive shaft 65 and worm 72 moves the worm 72 in relation to the fixture gear 40 from the position of Fig. 9a to the position of Fig. 9b to bring the driving face 74 of worm 72 into contact with the driven face 82a of worm gear 40. In Figs. 9a to 9e the amount of backlash is exaggerated to show more clearly the relative position of the drive and driven gear during operation. Thereafter, as shown in Fig. 9c rotation of the worm 72 rotates the index fixture in the direction indicated by the arrow. It will be noted that shaft portion 86, and hence worm 87, rotate in unison with drive shaft 65 so that worm 87 does not interfere with rotation of worm gear 40.

As the cam 115 rotates, dog 270 releases switch 6LS to deenergize relay 26LR and hence relay 26CR. This deenergizes relay 27SR and solenoid 140 of valve 139, so that valve member 141 returns to the position shown in Fig. 7. This cuts off pressure in conduit 244 and hence chambers 226 and 227, and permits discharge from these chambers through conduit 244, passage 147 of valve 139, conduit 171a, conduit 171, groove 132 of valve 121, and conduit 172 to reservoir 137. Thus, the follower 241 is dropped to ride on cam 116 and the locking pin 230 is dropped to ride on cam 115, the locking shoulder having at this time rotated in the clockwise direction from the position as shown in Fig. 7. Since at this time the cam follower 241 rides on a relatively high surface on the cam 116 the passages 251a and 255 remain connected through valve chamber 227 and the normal feed rate is unimpaired.

Cams 115 and 116 rotate in unison, being both connected by gearing to drive shaft 65 as shown in Fig. 2, and as they approach the completion of one revolution the follower 241 drops into a recess 116a in the cam surface to disconnect conduits 251a and 255 which formed part of the discharge passage from the hydraulic motor 107. The discharge from the motor is thus diverted from conduit 251 through conduit 251b, throttle valve 253, conduit 254, conduit 255, throttle valve 256, conduit 255a, and conduit 172 to the reservoir 137. This discharge through the additional throttle valve 253 slows the motor to minimize the impact of the locking shoulder 231 of cam 115 and stop pin 230.

Figure 9D:
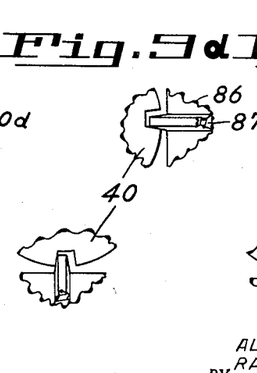
Figure 9E:
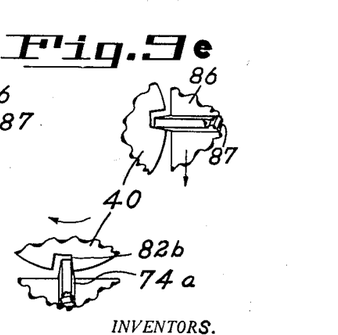

The contact of the cam 115 with the stop pin 230 stops the motor at the end of one revolution of the cam. Since the motor tends to rotate the drive shaft 65 and urge the cam against the pin, and since the cam rotates in one direction only, each rotation of the cam will measure a precise rotation of the drive shaft 65 and worm 72 regardless of any backlash which might otherwise be present in the gears 81, 108, and 111. At this time, the relative position of the drive worm 72 and the fixture worm gear wheel 40 is, as shown in Fig. 9d, the same as during the driving of the worm gear 40 by the drive worm 72. As the cam 115 completes its revolution, the switch 6LS is again operated to deenergize relay 28SR and hence solenoid 168 of valve 156 so that the valve member 157 of valve 156 shifts to the original position as shown in Fig. 7. This returns pressure to conduit 190. Pressure from conduit 190 is immediately transmitted through conduit 190a to cylinder 176 to move the worm 87 longitudinally and hence rotate the worm gear 40 as shown in Fig. 9e. This urges the faces 82b opposite the driven faces of gear 40 against the face 74a opposite the driving face of drive worm 72. This concludes the indexing movement of the fixture 18. It will be noted that the movement of the gear 40, and hence the fixture 18, is begun and ended with the relatively unworn faces of the drive and driven gear in firm contact to assure accurate positioning at the beginning and end of the indexing cycle and hence precise predetermined movement of the workpiece. After the worm gear has been rotated to the position of Fig. 9e, the cylinder 177 is operated to clamp the index fixture to the fixture bed, firmly holding the teeth with their drive and driven faces out of contact. Delay in operating the cylinder 177 results from operation of the sequence valve 215. Fluid entering this valve from conduit 190b cannot immediately enter conduit 210 since this latter conduit is blocked by spool 219. Only after the valve member 218 is moved by pressure supplied through passage 212 can fluid flow from conduit 190b to conduit 210.

Rapid indexing to carry the workpiece through many index angles without stopping will occur if switches 3CR1 and 3CR2 are closed and push button switch 20PB operated to close contacts 20PB1, 20PB2 and open contact 20PB3. This energizes relay 26SR and releases relay 29SR to energize solenoid 124 and release solenoid 123 of valve 121, thus shifting valve member 125 to the left of the position shown in Fig. 7. With the valve in this position, pressure is applied, as before, to motor 107 through conduit 250. However, the pressure is relieved from conduit 255b and that line defines an additional discharge path from the motor, by passing throttle valve 256, and passing fluid through passage 130 and conduit 172 to the reservoir 137. This permits more rapid rotation of the motor 107 and hence the index fixture 18. The reduced pressure in the conduit 255b release switch 20PS to close contacts 20PS1 and energize relay 27 SR. This operates valve 139 and holds the stop pin 230 out of contact with the cam 115.

While we have shown and described a specific embodiment of the present invention it will be understood that various modifications can be made without departing from the spirit and scope of the appended claims.

What we claim as new and useful and desire to secure by United States Letters Patent is:

1. In a machine tool a driven gear, a drive shaft, a drive gear secured to the drive shaft to engage the driven gear, means selectively to rotate said drive shaft through a predetermined angle, a second shaft having two portions in non-rotating and telescoping relationship, one portion having means for engagement with the drive shaft to rotate said second shaft in unison with the drive shaft and the other portion carrying a gear thereon non-rotatable in relation thereto and engaged with the driven gear, and means to exert a force against the end of the latter portion of the shaft when the drive shaft is not rotating to move that portion and hereby rotate the driven gear and urge it against the drive gear.

2. A mechanism for eliminating backlash in a rotating indexing fixture comprising a worm gear having teeth and carried by the fixture, a drive shaft, a worm secured to the drive shaft, the worm being in engagement with the worm gear, means to selectively rotate said drive shaft through a predetermined angle, a second shaft movable in the longitudinal direction and having a worm in engagement with the worm gear, means to rotate said second shaft, and means selectively to move said second shaft in the longitudinal direction to rotate the worm gear and urge the teeth thereon against the worm on the drive shaft before rotation thereof to eliminiate the backlash between the drive shaft and the indexing fixture.

3. A mechanism for eliminating backlash in an indexing fixture rotatably mounted on a bed comprising in combination: a worm gear on the fixture and rotatable in a normal operating direction in relation to the bed, the worm gear having external teeth each with a driven face and an opposite face; a drive shaft rotatably mounted in the bed; a worm having a driving face and an opposite face secured to the drive shaft and in engagement with the worm gear; means selectively to rotate said drive shaft; a second shaft rotatably mounted in the bed and having a worm in engagement with the worm gear, the second shaft being movable in a direction substantially tangential to the worm gear and engaged with the drive shaft for rotation as the latter rotates; and means selectively to move said second shaft in a substantially tangential direction to rotate the worm gear in the normal operating direction and urge the opposite faces of some of the teeth thereon against the opposite face of the worm on the driven shaft before rotation thereof to eliminate the backlash between the drive shaft and the indexing fixture.

4. A mechanism for eliminating backlash in a rotating indexing fixture mounted on a non-rotatable bed comprising in combination: a worm gear mounted on the fixture and rotatable in a normal operating direction in relation to the bed, the worm gear having external teeth with driven faces and opposite faces; a drive shaft rotatably mounted in the bed; a worm having a driving face and an opposite face secured to the drive shaft and in engagement with the worm gear; means selectively to rotate said drive shaft through a predetermined angle; means to lock said drive shaft after rotation; a second shaft rotatably mounted in the bed and having a worm in engagement with the worm gear, said second shaft having a sleeve portion at one end slidable and non-rotatable in relation to the remainder of the shaft and the worm carried thereon; means on said sleeve portion of the second shaft to engage the drive shaft for rotation therewith; and means selectively to move the worm carrying portion of said second shaft in a direction substantially tangential to the worm gear to rotate the same in the normal operating direction and urge the opposite faces of some of the teeth thereon against the opposite face of the worm on the drive shaft before rotation thereof to eliminate the backlash between the drive shaft and the indexing fixture.

5. A mechanism for eliminating backlash in a member rotatably mounted in a second member in a machine tool comprising in combination: a worm gear carried on the rotatable member, the worm gear having external teeth with driven faces and opposite faces; a drive shaft mounted in said other member; a worm having a driving face and an opposite face secured to the drive shaft and in engagement with the worm gear; means selectively to rotate said drive shaft; a second shaft mounted in said other member comprising a worm-carrying portion and a second portion, said worm-carrying portion being movable longitudinally in relation to the second portion and rotatable therewith; a worm carried on the worm carrying portion of the shaft and in engagement with the worm gear; a gear on the second portion of the shaft engaged with the drive shaft for rotation therewith; a hydraulic cylinder in operating relation to the worm carrying portion of said second shaft to move said portion when actuated in a substantially longitudinal direction; and means to actuate said hydraulic cylinder and rotate the worm gear to urge the opposite face of some of the teeth thereon against the opposite face of the worm on the drive shaft before rotation thereof to eliminate the backlash between the drive shaft and the rotatable member.

6. A mechanism for eliminating backlash in an indexing fixture rotatably mounted on a bed comprising in combination: means selectively to clamp the fixture to the bed; a worm gear having teeth carried on the fixture; a drive shaft; a worm secured to the drive shaft and in engagement with the worm gear; means to rotate the drive shaft; means to lock said drive shaft after a predetermined rotation; a second shaft movable in the longitudinal direction and having a worm in engagement with the worm gear; means to rotate said second shaft with the drive shaft; means to apply pressure to said second shaft to move the same in longitudinal direction and rotate the worm gear to urge the teeth thereon against the worm on the drive shaft; and means sequentially to release the fixture clamping means, release the drive shaft locking means, actuate the means to rotate the drive shaft, actuate the drive shaft locking means, actuate the pressure means on the second shaft, and actuate the clamping means.

7. In a machine tool, a fixture bed, an indexing fixture rotatably mounted in the fixture bed and having a worm gear wheel, a drive shaft having a worm engaged with said worm gear wheel, a rotatable locking member, means connecting said locking member to the drive shaft for rotation therewith, a locking pin, means to engage the locking pin with the locking member after a predetermined rotation of the drive shaft, an hydraulic motor in driving relationship with the drive shaft, a source of fluid under pressure, means selectively to connect said source to the motor, a movable second shaft having a worm engaged with said worm gear wheel, means to move said second shaft in relation to said worm gear wheel, and means operable sequentially to release the pressure from the hydraulic motor, to disengage the locking pin and locking member, to restore the pressure to the hydraulic motor and rotate the indexing fixture, to engage the locking member and pin while pressure is maintained on the motor to hold the locking pin and member in firm engagement and lock the drive shaft and worm, and to move the second shaft to rotate the worm gear wheel against the locked drive worm.

8. In a machine tool in which a series of cutting strokes are taken across a workpiece, a fixture adapted to carry the work piece and having a driven gear having teeth with driving faces and opposite faces, a drive shaft, a drive gear having a driving face and an opposite face, the drive gear secured to the drive shaft to engage the driven gear, a locking mechanism comprising a rotatable member and a movable member adapted to engage said rotatable member, means connecting the rotating member of the locking mechanism and the drive shaft for simultaneous rotation, a second shaft having a gear non-rotatably carried thereon in engagement with the driven gear and movable in a direction tangential to the driven gear, means to rotate said second shaft as the drive shaft rotates, means operable in response to the termination of a cutting stroke to move the movable member out of engagement with the rotatable member of the locking mechanism, means operable in response to the movement of the movable member of the locking mechanism to rotate said drive shaft, means to engage the members of the locking mechanism at the termination of one revolution of the rotatable locking member and stop rotation of the drive shaft, and means operable at the termination of one revolution of the rotatable locking member to move said second shaft in a direction tangential to the driven gear and thereby rotate the driven gear and urge the opposite faces of some of its teeth into engagement with the opposite face of the drive gear.

9. In a machine tool in which a plurality of cutting operations are performed on a workpiece, a bed, a fixture mounted for rotation in a normal operating direction in the bed and adapted to carry the workpiece, the fixture having a driven worm gear with teeth having driven faces and opposite faces, means operable alternately to clamp and unclamp the fixture in the bed, a drive shaft rotatably mounted in the bed and having a worm with a driving face and an opposite face in engagement with the worm gear, a locking member operatively connected to the drive shaft for rotation therewith, means operable to engage the locking member and stop rotation of the drive shaft after a predetermined rotation, a hydraulic motor in operating relationship with the drive shaft, a source of fluid under pressure, means operable alternately to connect and disconnect said source to the motor, a second shaft having two telescoping portions, said portions being slidable longitudinally and non-rotatable in relation to each other, one of said portions being in engagement with the drive shaft for rotation therewith and the other of said portions carrying a worm in engagement with the worm gear, a hydraulic cylinder in operating relation to the worm carrying portion of the second shaft to move the same longitudinally in one direction only to rotate the worm gear in the normal operating direction and urge the opposite faces of some of the teeth thereon into engagement with the opposite face of the drive worm, and means sequentially to release the clamping means, to disconnect the source of pressure from the motor, to release the means engaging the locking member, to connect the motor to the source of pressure and thereby rotate the indexing fixture and workpiece in the normal operating direction toward a position for a cutting operation, to engage the locking member to stop rotation of the drive shaft and thereby hold the same in a rigidly locked position by force of the motor, to move the worm carrying portion of the second shaft to continue rotation of the worm gear and fixture in the normal operating direction and urge the opposite face of the worm gear teeth against the opposite face of the drive worm, and actuate the clamping means to firmly hold the workpiece for cutting operation with the driving and driven faces of the worm and worm gear out of contact.

10. A mechanism for eliminating backlash in a rotating indexing fixture comprising a worm gear having teeth and carried by the fixture, a pair of shafts each having a worm thereon engaged with the teeth of the worm wheel, means to rotate said shafts in unison through a predetermined angle for rotation of the worm gear, and means to move one of said shafts in the longitudinal direction when the other shaft is not rotating to urge the teeth of the worm gear against the worm on said other shaft.

References Cited in the file of this patent

UNITED STATES PATENTS

| | | |
|---|---|---|
| 1,234,771 | Kiewicz | July 31, 1917 |
| 2,254,784 | Silven | Sept. 2, 1941 |
| 2,302,575 | Romaine et al. | Nov. 17, 1942 |
| 2,786,360 | Cameron | Mar. 26, 1957 |